Sept. 6, 1949. P. O. UNGER 2,480,983
HYGROSCOPIC COIL FOR HUMIDITY INDICATORS
Filed Feb. 14, 1947
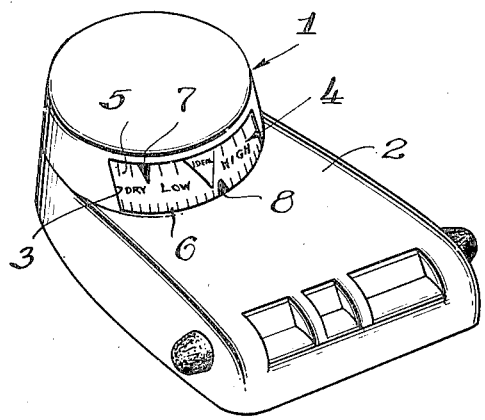
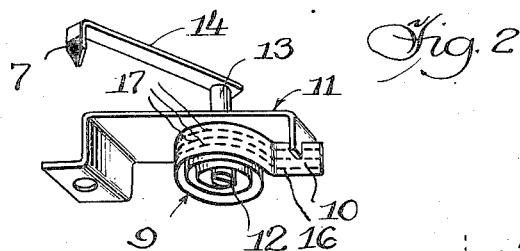
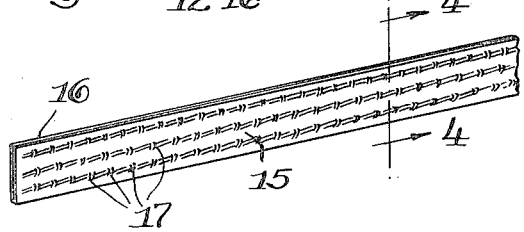
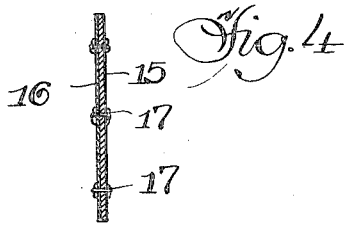

Patented Sept. 6, 1949

2,480,983

UNITED STATES PATENT OFFICE 2,480,983

HYGROSCOPIC COIL FOR HUMIDITY INDICATORS

Paul O. Unger, Elmhurst, Ill., assignor to Autopoint Company, Chicago, Ill., a corporation of Illinois Application February 14, 1947, Serial No. 728,645

9 Claims. (Cl. 297—1)

The present invention relates to a humidity indicating mechanism or device for indicating the relative humidity in a room or other enclosure and more particularly to a novel hygroscopic coil or element for use in such indicating mechanism.

The recording or indicating of the relative humidity by a suitable instrument embodying a member formed of a strip of hygroscopic material attached to a strip or backing of thin metal or the like and in which changes in the physical dimensions are indicative of the relative humidity have been employed. However, in such prior devices the hygroscopic material has been either affixed to the metal backing by an adhesive, or the longitudinal edges of the metal or backing have been bent or flanged over the edges of the hygroscopic strip.

Both of these prior methods have numerous inherent disadvantages, the most important of which is that the hygroscopic material in such devices in a relatively short time become loose or partially detached and unless they remain permanently united to the metal strip or tape longitudinally and transversely thereof, variations in the longitudinal dimensions of the hygroscopic or control material is not accurately transmitted to the metal strip and from it to the indicating means.

Joining the hygroscopic material or element to the metal backing by glue or other suitable adhesive, has the serious drawback that weather conditions affect the adhesive and thus the property of the absorbent or hygroscopic material to absorb moisture varies from day to day. As this adhesive dries out or loses its adhesive properties, the absorbent material becomes loose or detached and naturally its dimensional variations are not directly related or transmitted to the metal backing or tape for accurately indicating the relative humidity.

Attempts have been made to obviate the above condition by joining the hygroscopic or absorbent strip to the metal strip or backing by bending or flanging over the longitudinal edges of the backing strip onto the adjacent edges of the hygroscopic material. However, such method has been unsuccessful for the reason the hygroscopic material soon works loose or bows transversely.

Both of these methods have the further disadvantage that the underside of the hygroscopic material or strip, i. e. the side adjacent the metal strip, is not exposed to the humidity to be measured or determined.

The present novel embodiment of hygroscopic coil comprises a strip of hygroscopic or absorbent material permanently secured to a thin metallic strip or backing in such manner that they continuously function as a unit and any longitudinal extension or variation in the physical dimensions of the hygroscopic material is accurately transmitted to the thin metallic strip and from it to a suitable indicating means.

Another important object of the present invention is the novel means and manner of joining the hygroscopic strip and thin metal backing whereby both sides of the absorbent strip are exposed to the humidity to be determined and thereby assure maximum effectiveness. In the novel disclosed embodiment this is accomplished by longitudinally sewing or stitching these members together in such manner as to prevent their becoming loose or detached either longitudinally or transversely.

Succinctly stated, among the advantages of the present invention over such prior hygroscopic coils are as follows:

(1) There is no adhesive that will cause variation in the absorptive properties or characteristics of the hygroscopic or absorbent material.

(2) The edges remain exposed and not covered or flanged over.

(3) The hygroscopic or absorbent material cannot work loose or bow longitudinally or transversely.

(4) By sewing or stitching the hygroscopic material to the thin strip or tape of metal, perforations are made in the metal which expose the underside of the absorbent material.

(5) The threads used in stitching or sewing have a wicking action which augments the absorptive capacity of the hygroscopic coil.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing—

Figure 1 is a perspective view of an assembled humidity indicator employing the novel hygroscopic coil.

Fig. 2 is a view in perspective of the hygroscopic coil and assembled parts removed from the humidity indicator.

Fig. 3 is a fragmentary view in perspective of the composite strip of hydroscopic material and a metal backing, and before this composite strip is bent into the form of a coil.

Fig. 4 is a view in vertical cross-section taken in a plane represented by the line 4—4 of Fig. 3.

Referring more particularly to the disclosure in the drawing and the novel embodiment therein shown, Fig. 1 shows one form of humidity indicating device 1 in which the present hygroscopic coil is mounted and indicates or records the relative humidity in the room or enclosure in which the device is placed or located. As therein shown, the device includes a housing 2 having an opening 3 preferably enclosed by a transparency, and a stationary scale 4 divided to provide spaced indications 5 and 6, the upper ones 5 designating the relative humidity in the room or enclosure determined by a movable indicator or pointer 7, while the lower ones 6 may include indications for designating the room temperature by means of a movable indicator or pointer 8.

The novel hygroscopic coil 9 for indicating the relative humidity in the room or enclosure is shown as having its one end 10 suitably secured to and retained stationary by a bracket or support 11 mounted in the interior of the housing 2. The other end 12 is secured to a rotatable shaft 13 which in turn is connected to an arm 14 carrying the movable indicator or pointer 7.

The coil 9 is formed as more clearly shown in Figs. 3 and 4, and comprises a coextensive strip 15 of hygroscopic absorbent material and a thin metal backing or tape 16. This tape or backing is of a resilient or yieldable metal resistant to corrosion. Such a metal may be a thin strip of brass or the like having sufficient inherent resiliency or flexibility to coil or uncoil in accordance with the elongation or change in the dimensions of the hygroscopic material due to the moisture content or humidity of the atmosphere in the room or enclosure in which the humidity indicator is located.

In order that the elongation or change in dimensions of the hygroscopic strip 15 is accurately and promptly transmitted to the metal backing strip 16 and from it to the arm 14 and the indicator 7, and to prevent the strip 15 from becoming detached from the metal backing strip 16, these strips are securely joined by relatively closely spaced rows of stitching or sewing 17 and with each row preferably extending longitudinally of the composite strip. This sewing or stitching produces a permanent union between these strips and with the thread piercing the thin metal backing 16 closely spaced openings are provided in the latter which permit the moisture to enter and be transmitted to the underside of the hygroscopic strip 15. As the edges of this strip are also exposed to the moisture, it will be apparent that an accurate indication of the moisture content and relative humidity in the room may be had.

As the thread employed in sewing or stitching the strips together to form a composite and permanently joined element is of cotton or other material having a wicking action, the moisture absorptive capacity of the hygroscopic coil is enhanced. The material employed for the hygroscopic element 15 may be absorbent paper, wood pulp or other substance having the necessary absorption properties and characteristics.

After the composite strip is formed in the manner shown in Figs. 3 and 4, it is bent into the form of a coil as shown in Fig. 2, with the end 10 anchored upon the stationary bracket or support 11, and the other end 12 anchored in the slotted end of the rotatable shaft 13, whereby any elongation or change in dimensions of the hygroscopic strip 15 is promptly transmitted to the thin metal backing 16, and such elongation causes the coil to wind or unwind in accordance with the moisture absorbed. Thus the relative humidity is directly transmitted to the arm 14 and the indicator or pointer 7 which registers such relative humidity on the indications 5 on the scale 4.

Having thus disclosed the invention, I claim:

1. A hygroscopic coil for a humidity indicator, comprising a composite element including a thin metal backing, a strip of absorbent material and absorbent threads piercing the absorbent material and metal backing whereby they are permanently joined together.

2. In a hygroscopic coil for humidity indicators, a laminated member composed of a thin strip of flexible metal, a strip of hygroscopic material and spaced rows of threads joining and permanently connecting the hygroscopic material to the metal.

3. A hygroscopic coil for indicating the relative humidity in a room or other enclosure, comprising a member formed of a relatively thin strip of flexible metal, a thin strip of absorbent material coextensive therewith, and spaced rows of threads extending through and joining said strips together to form a permanently joined composite member.

4. A hygroscopic coil for a humidity indicator, comprising coextensive strips of an absorbent material and a thin flexible metal, and longitudinal rows of absorbed threads extending through the metal strip for permanently joining the strips.

5. A hygroscopic coil for indicating the relative humidity in a room or other enclosure, comprising a composite member formed into a coil and including a backing of thin flexible metal and a strip of hygroscopic material coextensive with the backing, and threads extending through and permanently joining said metal and hygroscopic material whereby to prevent detachment or loosening thereof due to elongation or change in dimensions of the hygroscopic material by reason of changes in the moisture content in the enclosure.

6. A hygroscopic coil for indicating the relative humidity in a room or other enclosure, comprising a composite member formed into a coil and including a backing of thin flexible metal and a strip of hygroscopic material coextensive with the backing, and spaced rows of threads stitching and joining the metal backing and hygroscopic material into a permanently joined composite structure.

7. A hygroscopic coil for a humidity indicator, comprising coextensive strips of an absorbent material and a thin flexible metal, and longitudinal rows of threads sewn through the flexible metal to thereat provide openings for exposing the underside of the hygroscopic material to the moisture content.

8. In a hygroscopic coil for humidity indicators, a laminated member composed of a thin strip of flexible metal and a strip of hygroscopic material, and longitudinal rows of threads of an absorbent material for joining the strips to form a composite structure, said threads extending through the flexible metal and having a wicking action for transmitting moisture to the hygroscopic material.

9. The method of forming a hygroscopic coil for humidity indicators, comprising the steps of providing coextensive lengths of a thin flexible metal backing and a hygroscopic material, sewing the coextensive lengths together with the threads extending therethrough to permanently unite these lengths into a composite member, and forming the composite member into a coil.

PAUL O. UNGER.

REFERENCES CITED

The following references are of record in the file of this patent:

UNITED STATES PATENTS

| Number | Name | Date |
|---|---|---|
| 505,142 | Temmel | Sept. 19, 1893 |
| 772,027 | Butterfield | Oct. 11, 1904 |
| 912,815 | Cook | Feb. 16, 1909 |
| 1,956,795 | Henning | May 1, 1934 |
| 2,016,973 | Pistilli | Oct. 8, 1935 |
| 2,093,767 | Rollefson | Sept. 21, 1937 |